June 29, 1937. E. ROBERTS Re. 20,432

GRID LINING FOR CENTRIFUGAL BASKETS

Original Filed April 14, 1934

Inventor
Eugene Roberts
by Geo. N. Goddard,
Attorney

Reissued June 29, 1937 Re. 20,432

UNITED STATES PATENT OFFICE 20,432

GRID LINING FOR CENTRIFUGAL BASKETS

Eugene Roberts, Hastings, N. Y., assignor to The Western States Machine Company, Salt Lake City, Utah, a corporation of Utah Original No. 2,028,168, dated January 21, 1936, Serial No. 720,614, April 14, 1934. Application for reissue December 16, 1936, Serial No. 116,123

12 Claims. (Cl. 210—76)

This invention relates to filter lining construction for centrifugal baskets and is intended to provide a construction of grid lining or backing element for supporting the fine filter element or sieve in order to facilitate the efficient drainage of the liquid that has passed through the filtering sieve on its way to the outlet holes in the basket wall. The efficiency of liquid extraction in a centrifugal basket depends in part upon providing a spacing element or support for holding the fine filter sieve in spaced relation away from the basket wall, while affording conduits or passages for the rapid unimpeded flow of the liquid to the outlet holes in the basket wall. If the flow of liquid from the sieve to the outlet holes be expedited through provision of suitable and ample drainage passages afforded by the backing or spacing element, the tendency of the liquid to cause gumming up and obstruction of these passages is largely eliminated and the centrifugal will continue to operate at full efficiency.

In my former Patent No. 1,581,089 granted April 13, 1926, I showed a grid lining or backing containing openings of large area surrounding each outlet hole of the basket and, while this arrangement was superior to the prior art constructions, I have discovered that it is possible to obtain a substantially higher degree of efficiency if the drainage areas, affording communication between the filter sieve and the outlet openings in the basket, are arranged to extend circumferentially of the basket so as to allow the liquid, that passes through the sieve, to have relative movement in a direction reverse to the rotation of the basket without obstruction and the present invention is intended to provide a construction that will provide ample circumferential passages for the circumferential flow of the liquid to the outlet holes without impediment, while at the same time providing a spacing grid or element of such strength and stiffness and still of light weight that will withstand the very heavy outward pressure of the centrifuged material without collapsing or bending.

The present invention embodies the principles which I have discovered by providing a rigid grid, preferably of sheet metal, capable of withstanding a much higher pressure than is needed for centrifugal requirements without collapsing and at the same time providing circumferential passages at the back of the sheet that are amply large to provide complete and unobstructed drainage to all the outlet holes formed in the centrifugal basket wall.

The provision of unobstructed circumferential passages between the supporting grid and the basket wall is particularly important in the centrifugal separation of material such as sugar from the viscous liquors surrounding the sugar crystals. These passages permit the liquor to be flashed from the crystals during acceleration of the basket to full speed and to lag behind the movement of the basket itself while seeking an outlet through the basket wall. Without them, the liquor is obstructed in its tendency to flow circumferentially, and when a large amount of liquor is quickly removed from the sugar it backs up into the sugar wall, causing gumming or smear and imperfect filtration.

Another important advantage of the improved construction is that it supports filter lining elements uniformly throughout the area of the linings and at a uniform distance from the basket wall, thus preventing irregularities from developing in the linings due to high centrifugal pressures and ensuring optimum filtration.

A preferred embodiment of my improved spacing grid comprises a metallic sheet formed with spaced rows of perforations and intervening rows of depressed, dome-like bosses projecting from the back of the sheet to form a multiplicity of firm supports spacing the sheet from the basket wall and providing wholly unobstructed passages for the flow of liquid to the outlet holes of the basket. This and other features of the invention will be described in the following specification and will be defined in the claims hereto annexed.

In the drawing I have shown one form that illustrates and embodies the principle of this invention, in which.

According to the practice illustrated in the accompanying drawing, I provide a thin flat sheet of metal 1 and punch out spaced rows of perforations, as shown at 2, and preferably the punch-receiving opening in the die is countersunk so that when the hole is punched out the edge of the opening is offset or depressed to form an annular stiffening or reenforcing lip 2a surrounding the opening.

Portions of the area between two adjacent rows of perforations 2 are also pressed rearwardly to form concavo-convex bosses 3 of a dome-like shape and the apical portions of these offset dome-like bosses are formed with short radial slits or notches extending from the bottom or center of the boss toward the base portion thereof, as illustrated at 3a, forming three short spaced tips which contact with the smooth face of the basket wall.

It will be seen that every perforation of the metal is surrounded with a rearwardly offset continuous rim or lip, as at 2a and as at 3, in the latter case the reenforcing ring being formed by depressing the material to form a substantially projecting deep boss, in this case terminating in a three-point contact and provided with openings to prevent accumulation of the liquid in the front or hollow face of the boss. A light thin sheet with this construction can be made exceedingly stiff and firm, while all the ridges surrounding and separating the depressions and perforations are formed with a very smooth, partly rounded surface presenting a most satisfactory surface for the support of the other elements of the filter lining.

Figure 1:
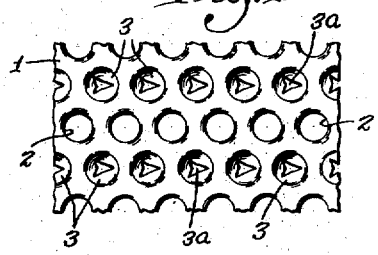
Fig. 1 is a view showing the inside or front face of the sheet.
Figure 2:
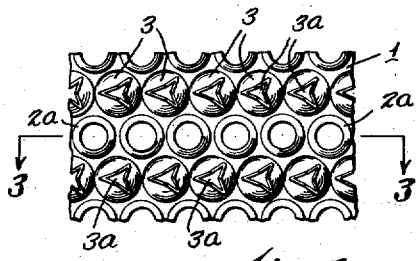
Fig. 2 is a view showing the back or rear face of the sheet.
Figure 4:
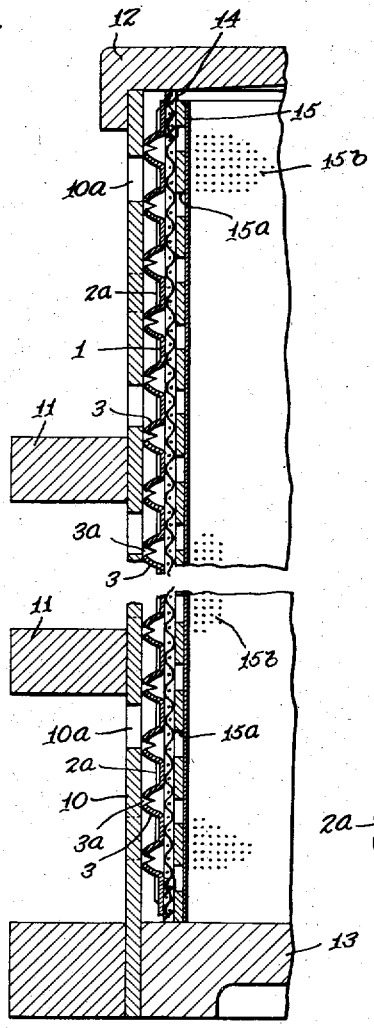
Fig. 4 is a vertical radial section through the periphery of a basket showing a complete filter lining assemblage in transverse section on a slightly enlarged scale, the middle portion of the basket and lining being broken away to permit illustration on a sufficiently large scale for better illustration. The filter thickness is exaggerated.
Figure 3:
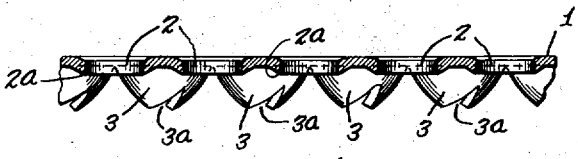
Fig. 3 is a cross sectional view on the plane indicated by line 3—3 of Fig. 2.

In Fig. 4 I have illustrated the preferred assemblage of a complete lining in a perforated centrifugal basket comprising the peripheral cylindrical wall 10 surrounded with usual reenforcing bands or rings 11 and having top and bottom members 12 and 13 of usual or desired construction.

In this assemblage the pressed metal grid 1 is inserted inside the basket and fits snugly against the perforated wall 10 of the basket and, by reason of the support of its multiple spacing bosses 3, provides very substantial circumferential drainage channels affording no obstruction or impedance to the circumferential flow of the liquid into the outlet holes 10a that have communication with the circumferential passages between the bosses.

In the assemblage shown, I have placed against the inside face of the grid lining a wire mesh lining member 14, about No. 8 mesh, whose top and bottom edges are embedded in selvage strips or borders of packing material somewhat similar to that disclosed in my United States Patent No. 1,946,500, dated February 16, 1934. The filter sieve element 15 is then placed inside the wire mesh intermediate lining and, in this case, is shown as comprising a composite filter element embracing a very finely perforated thin sheet 15b and a coarsely perforated heavier backing sheet 15a integrally united to form a single element which, however, forms no part of the present invention as it is the subject of another copending application filed by me.

Obviously the principal drainage of the liquid that has passed through the filtering sieve element will be effected through the holes 2a, which open into circumferential passages leading directly to the outlet holes in the basket wall. The slitting of the bosses allows a portion of the liquid to escape to the outlet holes, either directly or through the circumferential passages. With this arrangement, complete freedom is given for the liquid lagging behind the high speed revolution of the basket, while the individual channels have free communication with each other laterally between the supporting bosses.

To permit proper overlapping of the ends of the grid when placed in the basket, the end portion 1a of the sheet 1 is provided with simple perforations 5 and left flat without any upset bosses 3 or stiffening flanges 2a. Preferably the flat overlapping area 1a at one end of the sheet is ground off or beveled to a feather edge to avoid leaving any shoulder that would tend to form a vertical crease or shoulder in the delicate filter lining element that is supported by the grid. This permits stretch or circumferential play between the two overlapped ends of the grid and the flat overlap 1a should point in the direction opposite to the rotation of the basket to avoid any possibility of catching against the usual plow tip, which also extends in a direction opposite to the revolution of the basket.

While the sheet metal grid may be made of any suitable material, it is preferred for most purposes to make this grid of a non-corrosive sheet metal such as, for example, Monel metal.

Figure 6:
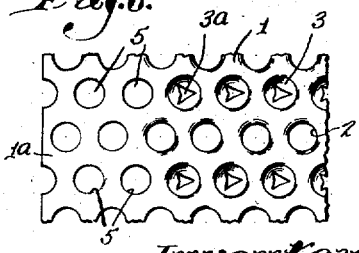
Fig. 6 is an elevation showing the flat overlapping portion of one end of the grid.
Figure 5:
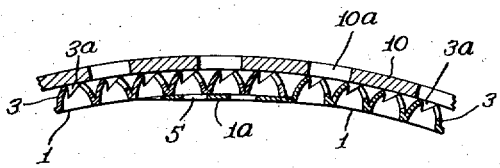
Fig. 5 is a horizontal section showing the overlapped end portions of the grid in a centrifugal basket.

In practice the metallic sheet, before being punched, may have one end perforated as at 1a in Fig. 6 before being fed through the perforating and upsetting machine. Then the remainder of the sheet will be subjected to the action of the perforating and upsetting punches to form the offset domes and intermediate perforations which characterize the main body of the grid. The length of the sheet will be somewhat greater than the inside circumferential measure of the basket for which it is intended, so that there will be a sufficient gap between the opposing tiers of bosses on the opposite end portions of the grid to take up the stretch as the grid becomes adjusted to the interior wall of the basket by the outward pressure of the centrifuged material.

In the foregoing description I have set forth details of construction of a preferred embodiment of the invention, but without intention that the invention be restricted to such details, except as required by the claims. It extends to grids or backings made of rigid material capable of withstanding higher pressures than are encountered in centrifugal operations without collapsing and to the provision therewith of ample facilities for flow of the centrifugally separated liquid through the backing and for drainage of this liquid to outlet openings of the basket wall by way of unobstructed circumferential passages.

I claim:

1. A filter supporting and spacing grid for a centrifugal basket lining comprising a metallic sheet formed with spaced rows of perforations, and intervening rows of spaced depressed dome-like hollow bosses projecting from the back of the sheet to form a multiplicity of firm supports spacing the sheet from the basket wall and providing unobstructed passages for the flow of liquid in a circumferential direction to the outlet holes in the basket wall.

2. A filter supporting and spacing grid for a centrifugal basket comprising a pressed metal sheet formed with spaced rows of perforations whose edges are offset to provide reenforcement for that portion of the metal, and intervening rows of depressed dome-like bosses projecting from the back of the sheet to form a multiplicity of firm supports spacing the sheet from the basket wall.

3. A filter supporting and spacing grid for a centrifugal basket comprising a metallic sheet formed with spaced rows of perforations, and intervening rows of depressed dome-like bosses projecting from the back of the sheet to form a multiplicity of firm supports spacing the sheet from the basket wall, said bosses having their apical portions slitted to subdivide the apical portions into spaced prongs and afford drainage for the interior of said domes.

4. A filter supporting and spacing grid for a centrifugal basket comprising a metallic sheet formed with spaced rows of perforations whose edges are offset to form peripheral stiffening lips, and intervening rows of depressed concavo-convex bosses projecting a substantial distance from the back of the sheet to form a multiplicity of firm rearwardly offset supports to space the sheet from the basket wall, said bosses having their bottom portion provided with slits forming a triangular opening in the bottom portion of each boss.

5. A filter sheet supporting and spacing grid for a centrifugal basket comprising a metallic sheet formed with spaced rows of relatively coarse perforations as compared with the openings in its filter sheet, and intervening rows of depressed dome-like hollow bosses projecting from the back of the sheet to form a multiplicity of firm supports to space the sheet from the basket wall, the individual bosses being arranged in staggered relation to the aforesaid perforations.

6. A filter supporting and spacing grid for a centrifugal basket comprising a perforated metallic sheet provided with rearwardly offset spacing bosses extending in rows lengthwise of the sheet between rows of perforations, one end of said sheet having a flat transverse marginal perforated area without projecting bosses to permit the flat area of the sheet to lie smooth against the front face of the other end in overlapped relation.

7. A filter supporting and spacing grid for a centrifugal basket comprising a perforated metallic sheet provided with rearwardly offset spacing bosses extending in rows lengthwise of the sheet between rows of perforations, one end of said sheet having a flat transverse marginal perforated area without projecting bosses to permit the flat area of the sheet to lie smooth against the front face of the other end in overlapped relation, the flat end portion of said sheet being reduced to a feather edge.

8. In combination, a centrifugal basket for separating crystals from liquid, and like uses, comprising a vertical wall having outlet perforations for the passage of liquid therethrough, a rigid backing of metal resistant to pressures encountered in centrifuging adjacent the inside of said wall and providing a base for a filter lining, said backing having openings therein of relatively large dimensions in comparison with the openings in the filtering means which it is adapted to support whereby to enable free passage of liquid to said wall, a plurality of circumferentially extending supporting means spaced apart vertically between the backing and wall in a manner to support the backing away from the wall and to provide circumferential channels between the backing and wall for unimpeded circumferential flow of liquid adjacent the inside of the wall during a centrifuging operation, and filtering means lying adjacent the inside of said lining.

9. A rigid backing for supporting and spacing a filter lining in a centrifugal basket, and composed of material resistant to pressures encountered in centrifuging, comprising a metallic sheet presenting a face for supporting filtering means, said sheet having a multiplicity of openings therein of relatively large dimensions in comparison with the openings in the filtering means which the backing is adapted to support whereby to enable free drainage of liquid from the filtering means to the basket wall and a plurality of circumferentially extending supporting means spaced apart vertically whereby to support the backing away from the wall and to provide circumferentially extending channels between the backing and wall for unimpeded circumferential flow of liquid adjacent the inside of the wall during a centrifuging operation.

10. A rigid backing for supporting and spacing a filter lining in a centrifugal basket, and composed of material resistant to pressures encountered in centrifuging, comprising a metallic sheet presenting a face for supporting filtering means, said sheet having a multiplicity of openings therein of relatively large dimensions in comparison with the openings in the filtering means which the backing is adapted to support whereby to enable free drainage of liquid from the filtering means to the basket wall and a plurality of circumferentially extending supporting means spaced apart vertically whereby to support the backing away from the wall and to provide circumferentially extending channels between the backing and wall for unimpeded circumferential flow of liquid adjacent the inside of the wall during a centrifuging operation, each of said circumferentially extending supporting means including a series of projections secured to the backing and adapted to engage the wall.

11. A rigid backing for supporting and spacing a filter lining in a centrifugal basket, and composed of material resistant to pressures encountered in centrifuging, comprising a metallic sheet presenting a face for supporting filtering means, said sheet having a multiplicity of openings therein of relatively large dimensions in comparison with the openings in the filtering means which the backing is adapted to support whereby to enable free drainage of liquid from the filtering means to the basket wall and a plurality of circumferentially extending supporting means spaced apart vertically whereby to support the backing away from the wall and to provide circumferentially extending channels between the backing and wall for unimpeded circumferential flow of liquid adjacent the inside of the wall during a centrifuging operation, each of said circumferentially extending supporting means including a series of projections pressed from said sheet and adapted to engage the wall.

12. A rigid backing for supporting and spacing a filter lining in a centrifugal basket, and composed of material resistant to pressures encountered in centrifuging, comprising a multiplicity of openings therein for free drainage of liquid from the filter lining to the basket wall and a plurality of circumferentially extending supporting means spaced apart vertically whereby to support the backing away from the wall and to provide circumferentially extending channels between the backing and wall for unimpeded circumferential flow of liquid adjacent the inside of the wall during a centrifuging operation, each of said circumferentially extending supporting means including a series of projections pressed from said backing and adapted to engage the wall, the depressed projections being provided with openings to permit the flow of liquid therethrough and laterally therefrom.

EUGENE ROBERTS.